Figure 1:
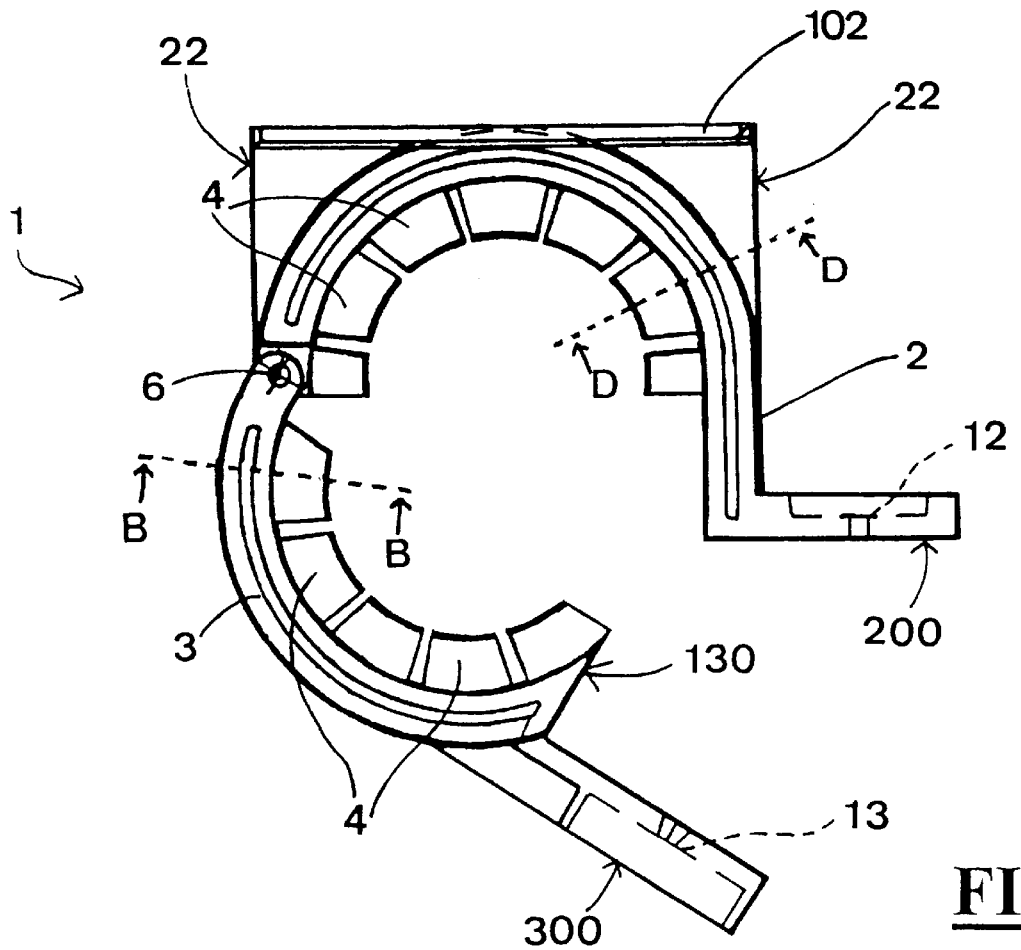

United States Patent
Poussard

[19]

[11] Patent Number: 6,098,256
[45] Date of Patent: Aug. 8, 2000

[54] ANTITHEFT COLLAR FOR BOTTLES

[75] Inventor: Jean-Claude Poussard, Romorantin, France

[73] Assignee: S.I.M., Societe Industrielle de Montoire/Loir, Chabris, France

[21] Appl. No.: 09/166,939

[22] Filed: Oct. 6, 1998

[30] Foreign Application Priority Data

Oct. 7, 1997 [FR] France ..................... 97 12485

[51] Int. Cl.[7] ............................ B65D 23/12; B65D 25/20
[52] U.S. Cl. .......................................... 24/704.1; 215/275
[58] Field of Search ........................ 24/704.1, 19, 24, 24/16 PB, 20 LS, 20 TT, 273, 279, 287, 288, 483, 484; 285/420, 92, 80, 253; 215/274, 275, 250; 220/320, 319, 321, 684; 292/256.67, 288, 305; 70/19, 455, 164, 158, 159, DIG. 49

[56] References Cited

U.S. PATENT DOCUMENTS

| | | | |
|---|---|---|---|
| 620,623 | 3/1899 | Weissenthanner | 215/275 |
| 643,908 | 2/1900 | Meyer | 215/275 |
| 2,675,253 | 4/1954 | Stade | 292/256.67 X |
| 4,176,756 | 12/1979 | Gellman | 215/274 |
| 4,377,245 | 3/1983 | Patty | 220/321 X |
| 4,457,445 | 7/1984 | Hanks et al. | 220/320 X |

FOREIGN PATENT DOCUMENTS

| | | |
|---|---|---|
| 2 608 285 | 6/1989 | France . |
| 2 704 592 | 11/1994 | France . |
| 2 264 921 | 9/1993 | United Kingdom . |

*Primary Examiner*—Anthony Knight
*Assistant Examiner*—Robert J. Sandy
*Attorney, Agent, or Firm*—Nixon & Vanderhye PC

[57] ABSTRACT

This invention relates to an antitheft collar for bottles, characterized in that it consists of two hinged half-rings that comprise additional removable locking means (12, 13) to ensure that the collar is locked around the neck of a bottle, whereby at least one (2) of half-rings (2, 3) comprises means (102, 142) for attaching a detectable device that is able to trigger a remote alarm, whereby the inside surface of each of the half-rings comprises a number of flanges (4) that are intended to come into contact and are deformed on the neck of the bottle when the collar is closed, whereby flanges (4) can be deformed so as to make it possible for the collar to fit bottle necks of various diameters.

11 Claims, 2 Drawing Sheets

ANTITHEFT COLLAR FOR BOTTLES

This invention relates to an antitheft collar for bottles. The invention relates more particularly to a collar that is intended to be attached around the neck of a bottle so as to constitute the support of a device that can be detected at a distance and is able to trigger an alarm in the case where the bottle is stolen.

To stop the theft of bottles in stores (hypermarkets), it is known to affix to the latter magnetic labels that can be deactivated and that make it possible to detect the passage of the bottle through a detection field.

This antitheft system, however, often proves ineffective because the antitheft labels can be easily torn off. Moreover, it is awkward to attach an antitheft magnetic disk to the bottle.

It is also known to insert into the plug or capsule inserts that can be detected, for example, magnetically. This solution makes it necessary to take precautions against fraud as early as at the production phase. Not all bottle manufacturers, however, are equipped to do so or necessarily see the advantage in obtaining such equipment since they do not always know in advance whether the entire production run will be bought by hypermarkets.

An object of the invention is to propose an antitheft collar for bottles that has great strength, is suitable for bottle necks of various diameters, and mitigates drawbacks of the prior art.

This object is achieved by virtue of the fact that the antitheft collar for bottles consists of two hinged half-rings that comprise additional removable locking means to ensure that the collar is locked around the neck of a bottle, whereby at least one of the half-rings comprises means for attaching a detectable device that is able to trigger a remote alarm, whereby the inside surface of each of the half-rings comprises a number of flanges that are intended to come into contact and are deformed on the neck of the bottle when the collar is closed, whereby the flanges can be deformed to make it possible for the collar to fit bottle necks of various diameters.

According to another particular feature, each of the flanges consists of two planar parts that are connected to the body of the half-ring at one of their edges so as to constitute a dihedral, whereby the two faces of the dihedral that are represented by the flange are arranged approximately symmetrically relative to the plane of the antitheft collar so as to form an approximately right angle, whereby the two faces of the dihedral are separated from one another by elasticity when the flange on the bottle neck is being deformed.

According to another particular feature, the flanges are arranged in such a way as to present no gap at the junction ends of the two half-rings, between the two adjacent flanges that belong respectively to the two half-rings.

According to another particular feature, the body of each half-ring is, in cross-section, approximately H-shaped.

According to another particular feature, one of the half-rings comprises an approximately planar wall that is tangent to the body of the half-ring and approximately parallel to the axis of symmetry of the collar, whereby the half-ring comprises at least one reinforcement rib that is formed between the planar wall and the body of the half-ring, whereby the upper end of the planar wall projects above the upper edge of the collar to constitute a first surface that is located opposite the neck of the bottle and forms a support for a first adhesive label such as a magnetic label that can be detected at a distance, whereby the collar is shaped so as to leave only a small space between the first surface and the neck of the bottle to prevent the magnetic label from being detached, whereby the second surface of the planar wall that is oriented toward the outside of the collar constitutes a support surface for a second adhesive label such as an information label.

According to another particular feature, the lower end of the planar wall projects below the lower edge of the collar and comprises means for attaching a detectable device that can trigger a remote alarm, whereby the collar comprises at least one reinforcement rib that is formed between the lower part of the planar wall and the body of the half-ring.

According to another particular feature, the free end of a first of the half-rings is approximately L-shaped and its base is oriented approximately toward the outside of the collar and constitutes a rigid tab, whereby the free end of the second half-ring comprises a rectilinear part and a rigid tab that forms, with the rectilinear part, an L angle that is intended to conform in shape to the L bend that is formed at the end of the first half-ring when the collar is closed, whereby the ends of the half-rings are shaped so that the tabs of the two half-rings are superposed in the closed position of the collar, whereby the tabs of the half-rings comprise additional movable locking means to ensure that the collar is locked around the neck of the bottle.

According to another particular feature, the rigid tab of the second half-ring is offset relative to the joint plane with the body of the half-ring, i.e., the rigid tab is located in the extension of a chord of the arc of a circle that is formed by the half-ring.

According to another particular feature, the additional removable locking means that ensure that the collar is closed around the neck of the bottle consist of a button-type safety device or "bubble" that is formed by a nail that is inserted into a first housing that is located on the tab of a first half-ring and whose point works with a hollow receiving button that is located in a housing of the tab of the second half-ring, whereby the receiving button comprises a wall that is pierced by a hole to receive the nail point and removable locking means for extracting the nail when the latter has been inserted into the hole.

According to another particular feature, the two half-rings that form the collar are made of molded plastic such as polypropylene that is filled with polyethylene.

According to another particular feature, the two half-rings are connected at one of their ends around an axis that consists of a snap-head rivet.

Figure 2A:
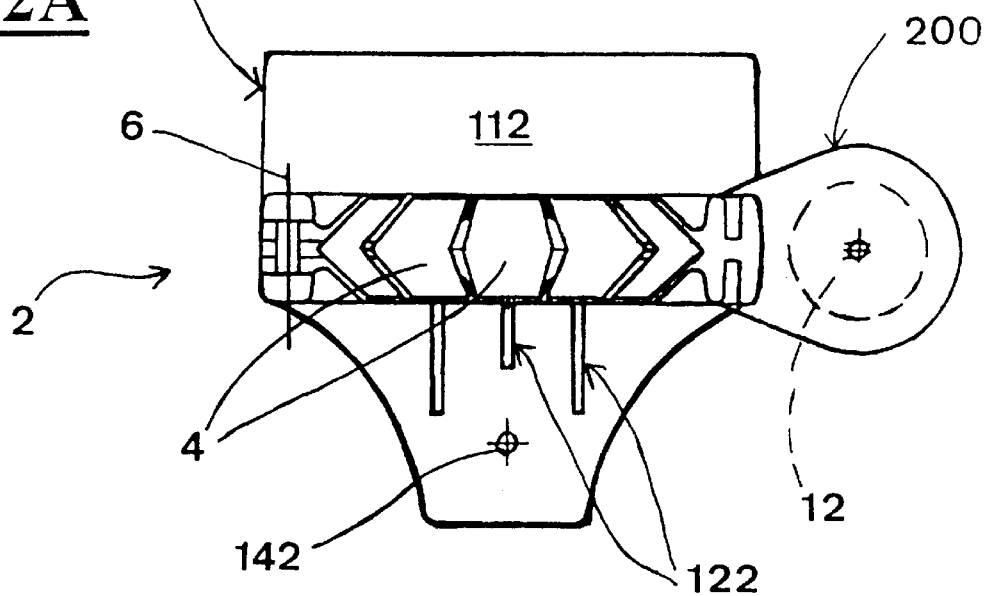
Figure 2B:
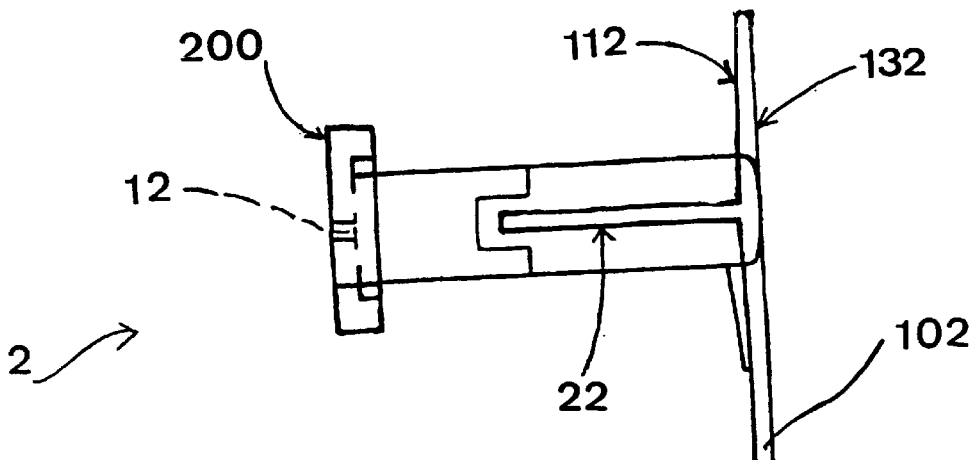
Figure 3:
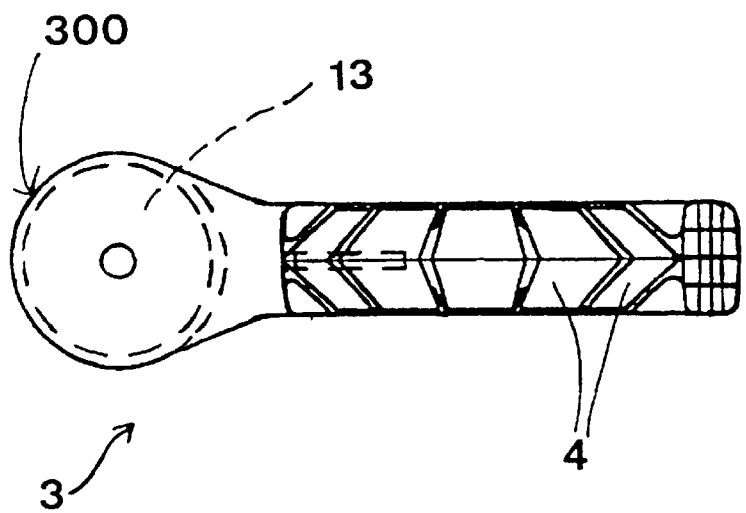
Figure 4:
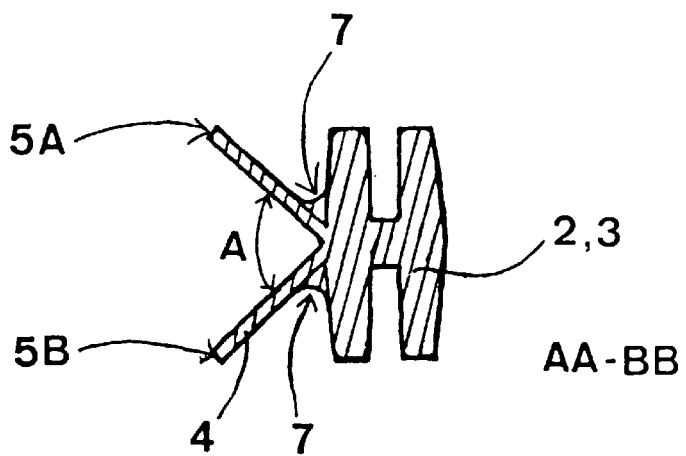

Other particular features and advantages of this invention will become clearer from reading the description below that is made in reference to the accompanying drawings, in which:

FIG. 1 depicts a top view, with the antitheft collar in a slightly open postion, for bottles according to the invention, FIG. 2A depicts a side and inside view of a first half-ring that constitutes the collar of FIG. 1, FIG. 2B depicts a side view of the half-ring of FIG. 2 and in a direction that is perpendicular to the view of FIG. 2, FIG. 3 depicts a side and inside view of a second half-ring that constitutes the collar of FIG. 1, FIG. 4 depicts a section along AA or BB of FIG. 1.

The invention will now be described in reference to FIGS. 1, 2A, 2B, 3 and 4. Antitheft bottle collar (1) according to the invention consists of two hinged half-rings (2, 3) that comprise additional removable locking means (12, 13) to ensure that the collar is locked around the neck of a bottle. At one of their ends, two half-rings (2, 3) can be connected in a hinged manner around an axis (6) that consists of, for example, a snap-head rivet. The inside surface of each of half-rings (2, 3), i.e., the surface that is intended to come into contact with the neck of the bottle, comprises a number of flanges (4). Flanges (4) can be deformed to make it possible to fit collar (1) to bottle necks of various diameters. In a preferred, but nonlimiting manner, each of flanges (4) consists of two planar walls (5A, 5B) that are connected to the body of half-ring (2, 3) at one of their edges so as to constitute a dihedral. A small space can be provided between two adjacent flanges (4) to allow, in particular, the latter to be deformed when the collar is locked around the neck of the bottle. Furthermore, the dimensions of flanges (4) decrease radially in the direction of the axis of symmetry of the collar to provide a circular space at the center of the collar whose dimensions are slightly smaller than those of the neck of the bottle. In this way, when the collar is closed around the neck of the bottle, flanges (4) are compressed and are deformed on the neck of the bottle. For example, to fit collar (1) to bottle necks with diameters that are between 28 and 32 mm, the central housing that is delimited by flanges (4) can have a diameter that is equal to about 26 mm. Advantageously, reinforcement ribs (7) can be provided at the edge of the dihedral to ensure the solid link between flanges (4) and the body of half-ring (2, 3) while making it possible for the latter to deform to fit the diameter of the neck of the bottle. Two faces (5A, 5B) of the dihedral that consists of flange (4) are arranged approximately symmetrically relative to the plane of collar (1). Angle (A) of the dihedral which is formed by two walls (5A, 5B) can be approximately equal to, for example, 90 degrees. In the embodiment of FIG. 4, the angle of the dihedral is equal to about 85 degrees. Of course, in the variant embodiments that are not shown, the angle of the dihedral can be greater than or less than 90 degrees. When collar (1) is locked around the neck of the bottle, two faces (5A, 5B) of the dihedral can be deformed elastically by being separated from one another. Furthermore, flanges (4) are arranged so that there is no gap at the junction ends of the two half-ring rings (2, 3) between two adjacent flanges (4) that belong respectively to the two half-rings. Thus, when collar (1) is closed around the neck of the bottle, there is very little, if any, space between flanges (4) of the ends of half-rings (2, 3) so as to make it possible to insert a tool to force open collar (1). The body of each half-ring (2, 3) can be, for example, approximately H-shaped in cross-section. This shape imparts great strength to collar (1) while ensuring sufficient elasticity to fit bottle necks of various diameters. A first (2) of the half-rings is provided with a wall (102) that is approximately planar and tangent to the body of half-ring (2). Planar wall (102) is, for example, approximately parallel to the axis of symmetry of the collar. Reinforcement ribs (22) can be provided between planar wall (102) and the body of half-ring (2) to prevent planar wall (102) from being pulled off. Collar (1) can comprise, for example, two ribs (22) that are located in a plane that is parallel to the plane of collar (1). Two ribs (22) are located, respectively, on both sides of the part of wall (102) that is tangent to half-ring (2). The upper end of planar wall (102) projects above the upper edge of collar (1) so as to constitute a first surface (112) that is located opposite the neck of the bottle. Said first (112) surface constitutes a support for, for example, a first adhesive label such as a magnetic label that can be detected at a distance. Advantageously, collar (1) is shaped so as to leave only a small space between first surface (112) of wall (102) and the neck of the bottle in order to prevent the magnetic label from being removed. Second (132) surface of planar wall (102), i.e., the one that is oriented toward the outside of collar (1), constitutes a support surface for, for example, a second label such as an information label. The lower end of planar wall (102) projects below the lower edge of collar (1) and comprises attachment means (142) of a detectable antitheft device that is able to trigger a remote alarm. Said means (142) for attaching a detectable device that can trigger a remote alarm can consist of, for example, an attachment eye (142). The antitheft device can consist of, for example, a magnetizable disk. Collar (1) can comprise reinforcement ribs (122), for example, three, that are formed between the lower part of planar wall (102) and the body of half-ring (2). As above, ribs (122) are provided for preventing planar wall (102) from being pulled off and thus from the device that is able to trigger a remote alarm. The free end of first half-ring (2) can have an L-shape, whose base (200), which is oriented approximately radially toward the outside of collar (1), constitutes a rigid first tab (200). The free end of second half-ring (3) can comprise a rectilinear part (130) and a rigid tab (300) which, with rectilinear part (130), forms an L angle that is intended to conform to the shape of the L bend that is formed at the end of first half-ring (2). Preferably, rigid tab (300) of second half-ring (3) is offset relative to the joint plane with the body of half ring (3), i.e., rigid tab (300) is located in the extension of a chord of the arc of a circle that is formed by half-ring (3). This arrangement of second rigid tab (300) limits the space taken up by collar (1) so as to keep the bottles that have the collar from obstructing one another when, for example, they are arranged in pigeonholes. The ends of two half-rings (2, 3) are shaped in such a way that, when the collar is closed (1), two rigid tabs (200, 300) are superposed. The removable locking means that ensure the locking of the collar around the neck of the bottle are located in rigid tabs (200, 300). Thus, when collar (1) is locked around the neck of the bottle, it is locked on the neck by the protuberance of the neck that prevents it from sliding out. The removable locking means that ensure the closing of collar (1) around the neck of the bottle can consist of, for example, a button-type safety device that is called "bubble" in the field. The latter is formed by a nail that is inserted into a first housing (12) which is located in tab (200) of a first half-ring (2) and whose point, which may have notches, works with a hollow receiving button, a wall of which is pierced by a hole for receiving the nail point and which comprises inside means such as, for example, clips for preventing the extraction of the nail when the latter has been inserted into the hole. A second housing (13) of tab (300) of second half-ring (3) makes it possible to receive this button. The raised edges of two housings (12, 13) protect the safety button against the action of cutting or drilling tools that are used in opening attempts. These means are arranged to release the nail point when the nail-button unit is subjected to the action of a magnetic field. Of course, the removable locking means that ensure the closing of collar (1) can consist of any equivalent device.

Two half-rings (2, 3) that form collar (1) can be made of molded plastic or any other material. Preferably, collar (1) is made of polypropylene that is filled with polyethylene, which imparts to it great strength while ensuring sufficient elasticity to fit bottle necks of various diameters.

Other modifications within the grasp of one skilled in the art will also form part of the spirit of the invention.

What is claimed is:

1. An antitheft collar for bottles, comprising two hinged half-rings that comprise removable locking means to ensure that the collar is lockable around a neck of a bottle, wherein at least one of said half-rings comprises means for attaching a detectable device that is able to trigger a remote alarm, whereby an inside surface of each of the half-rings comprises a number of flanges that are intended to come into contact with and are deformable on the neck of the bottle when the collar is closed, wherein said flanges can be deformed for the collar to fit bottle necks of various diameters.

2. An antitheft collar for bottles according to claim 1, wherein each of said flanges consists of two planar parts that are connected to a body of each of the half-ring at one edge thereof so as to constitute a dihedral, whereby two faces of the dihedral that include each of said flange are arranged approximately symmetrically relative to a plane of the antitheft collar so as to form an approximately right angle, wherein said two faces of the dihedral are separated from one another by an elasticity of each said flange when each said flange is deformed on the bottle neck.

3. An antitheft collar for bottles according to claim 1, wherein said flanges are arranged in such a way as to present no gap at junction ends of each of the two half-rings, between two adjacent flanges of said flanges that belong, respectively, to the two half-rings.

4. An antitheft collar for bottles according to claim 1, wherein a body of each of the two half-rings, in cross-section, is approximately H-shaped.

5. An antitheft collar for bottles according to claim 1, wherein one of the half-rings comprises an approximately planar wall that is tangent to a body of the one half-ring and approximately parallel to the axis of symmetry of the collar, wherein the one half-ring comprises at least one reinforcement rib that is formed between said planar wall and the body of the one half-ring, wherein an upper end of the planar wall projects above an upper edge of the collar so as to constitute a first surface that is located opposite the neck of the bottle and forms a support for a first label that can be detected at a distance, wherein the collar is shaped so as to leave only a small space between said first surface and the neck of the bottle so as to prevent the magnetic label from being detached, wherein a second surface of said planar wall, which is oriented toward an outside of the collar, constitutes a support surface for a second label.

6. An antitheft collar for bottles according to claim 5, wherein a lower end of said planar wall projects below a lower edge of the collar and comprises means for attaching a detectable device that can trigger a remote alarm, wherein the collar comprises at least one reinforcement rib that is formed between a lower part of said planar wall and the body of the one half-ring.

7. An antitheft collar for bottles according to claim 6, wherein a free end of a first of the two half-rings is approximately L-shaped and its base is oriented approximately toward a outside of the collar and constitutes a rigid tab, whereby the free end of a second one of the two half-rings comprises a rectilinear part and a rigid tab which, with said rectilinear part, forms an L-shaped angle that is intended to conform to the shape of an L-shaped bend that is formed at the end of said first one of the two half-rings when the collar is closed, wherein ends of the two half-rings are shaped so that said tabs of the two half-rings are superposed when said collar is in the closed position, wherein tabs of the two half-rings comprise movable locking means to ensure that the collar is lockable around the neck of the bottle.

8. An antitheft collar for bottles according to claim 7, wherein said rigid tab of said second half-ring is offset relative to a joint plane with the body of the second half-ring, the rigid tab of the second half-ring is located in an extension of a chord of an arc of a circle that is formed by the second half-ring.

9. An antitheft collar for bottles according to claim 7, wherein the removable locking means that ensure that the collar is lockable around the neck of the bottle includes a safety device that is formed by a nail that is inserted into a first housing that is located on the tab of the first half-ring and a point thereof works with a hollow receiving button that is located in a housing of the tab of the second half-ring, wherein the receiving button comprises a wall that is pierced by a hole to receive a nail point of said nail and removable locking means for the extraction of the nail when the nail has been inserted into the hole.

10. An antitheft collar for bottles according to claim 1, wherein said two half-rings (2, 3) that form the collar are made of molded plastic that is filled with polyethylene.

11. An antitheft collar for bottles according to claim 1, the two half-rings are hinged together around an axis that includes a snap-head rivet.

* * * * *